United States Patent Office
2,978,474
Patented Apr. 4, 1961

2,978,474
NITRO-AMINO DIISOCYANATES

Karl Klager, Monrovia, and Milton B. Frankel, Pasadena, Calif., assignors to Aerojet-General Corporation, Azusa, Calif., a corporation of Ohio No Drawing. Filed Oct. 25, 1954, Ser. No. 464,609

12 Claims. (Cl. 260—453)

This invention relates to a new class of bi-functional polynitro compounds and more particularly it relates to a new series of nitro-amino diisocyanates having the general formula:

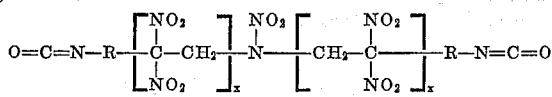

wherein R is a lower alkylene radical, and $x$ is a small whole number from 1 to 3 inclusive.

The compounds of the present invention find valuable use as intermediates in the preparation of high explosives and solid propellant compositions. They readily condense with nitroalkanols such as 2,2,2-trinitroethanol to form highly nitrated polyurethanes. This procedure is described in detail in assignee's copending application No. 464,610 filed concurrently with the present application. These compositions are useful as high explosives and as such can be used as the explosive charge in the warhead of any conventional explosive missile, projectile, rocket, or the like. Such a device is disclosed in U.S. Patent No. 2,470,162. The diisocyanates of this invention also condense with nitro-substituted polyhydric alcohols to form high molecular weight polyurethane resins which are themselves useful as solid propellant compositions.

The art, for many years, has recognized the valuable properties of certain related nitro-substituted organic compounds for use as explosives and propellants, however the carbo-nitro groupings of these compounds are relatively unstable, rendering their production and handling both difficult and hazardous. The compounds of the present invention, possessing the stabilizing nitroamino groups, may be manufactured with greater ease and also possess a much higher specific impulse than the less stable carbonitro compounds heretofore commonly used.

The preparation of the polynitro nitro-amino diisocyanates of the present invention proceeds in accordance with the general reaction scheme set forth below:

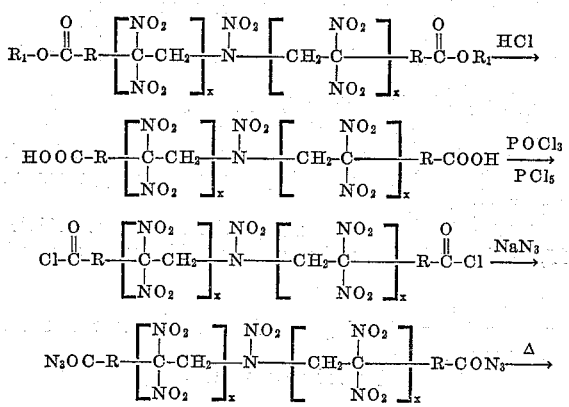

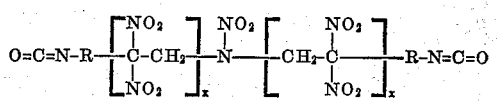

$R_1$=lower alkyl
$R$=lower alkylene
$x$=1, 2, or 3

A dialkyl ester of an appropriate nitro-substituted nitroaza alkanedioic acid is hydrolyzed to the free acid which is converted to the corresponding diacid halide by the action of a suitable halogenating agent such as $PCl_5$. The acid halide thus obtained is then reacted with sodium azide and heated to effect rearrangement to the desired diisocyanate.

The starting materials used in the practice of this invention are conveniently prepared by reacting a dinitrohydroxy ester with ammonia and subsequently nitrating the resultant product with nitric acid. These procedures are more fully described in our copending applications Nos. 416,381 and 416,382 filed March 15, 1954, now both abandoned.

The following examples are provided to more clearly define the invention:

EXAMPLE I

Preparation of 4,4,6,8,8-pentanitro-6-aza-undecanedioic acid

In a one-liter Erlenmeyer flask was placed 85 gms. (0.18 mole) of dimethyl-4,4,6,8,8-pentanitro-6-aza-undecanedioate and 500 ml. of concentrated hydrochloric acid. The mixture was heated on a steam bath for 1.5 hours. The solid was collected, washed with water, and recrystallized from methanol and water to give 50.0 gms. (80.0%) of 4,4,6,8,8 - pentanitro - 6 - aza-undecanedioic acid, melting point, 202–205° C.

Analysis.—Calc'd. for $C_{10}H_{14}N_6O_{14}$: %C, 27.16; %H, 3.19; %N, 19.00. Found: %C, 27.90; %H, 3.32; %N, 18.79.

EXAMPLE II

Preparation of 4,4,6,8,8 - pentanitro-6-aza-undecanedioyl chloride

In a 50-ml. Erlenmeyer flask was placed 3.0 gms. (0.0068 mole) of 4,4,6,8,8-pentanitro-6-aza-undecanedioic acid and 3 ml. of phosphorous oxychloride. Enough phosphorous pentachloride was added to give a solution when the reaction mixture was warmed on the steam bath. The solution was heated on the steam bath for 10 minutes and benzene was added to precipitate 2.0 gms. (61.4%) of the white solid. The product was purified by dissolving in phosphorous oxychloride and reprecipitating with hexane, melting point 152–155° C, I.S.=90–100 cm./2 kg.

Analysis.—Calc'd. for $C_{10}H_{12}N_6O_{12}Cl_2$: %C, 25.06; %H, 2.53; %N, 17.54; %Cl, 14.90. Found: %C, 25.43; %H, 3.04; %N, 19.38; %Cl, 13.84.

EXAMPLE III

Preparation of 3,3,5,7,7-pentanitro - 5 - aza-nonane diisocyanate

In a 500-ml. 3-necked flask, fitted with a mechanical stirrer and thermometer, was placed 12.5 gms. of crude 4,4,6,8,8-pentanitro - 6 - aza-undecanedioyl chloride, 150 ml. of glacial acetic acid and 10 gms. of sodium azide. The reaction mixture was stirred for one hour at 15–20° C.; no heat of reaction was evident. Methylene chloride, 150 ml., was added and the mixture was washed with water, 1% sodium bicarbonate, and water. The methylene chloride solution was dried and concentrated in vacuo to give a white solid, melting point 80–90° C. Dry chloroform was added to the solid and the solution was refluxed for two hours with the evolution of 0.5 liter of nitrogen gas. The solution was concentrated in vacuo leaving a brown solid. The product was dissolved in dioxane and reprecipitated with carbon tetrachloride. Recrystallization from chloroform gave a white crystalline solid, melting point 92–95° C.

*Analysis.*—Calc'd. for $C_{10}H_{12}N_8O_{12}$: %C, 27.53; %H, 2.77; %N, 25.69. Found: %C, 28.38; %H, 3.22; %N, 25.71.

By utilizing as starting materials the esters of 4,4,6,8,8-pentanitro-6-aza-undecane-1,11-dioic acid, 5,5,7,9,9-pentanitro-7-aza-tridecane-1,13-dioic acid, 6,6,8,10,10-pentanitro-8-aza-pentadecane-1,15-dioic acid, 4,4,6,6,8,10,10,12,12-nonanitro-8-aza-pentadecane-1,15-dioic acid and 4,4,6,6,8,8,10,12,12,14,14,16,16-tridecanitro-10-aza-nonadecane-1,19-dioic acid and proceeding in accordance with the examples set forth above, one obtains the corresponding diisocyanates, namely, 3,3,5,7,7-pentanitro-5-aza-nonane-1,9-diisocyanate, 4,4,6,8,8-pentanitro-6-aza-undecane-1,11-diisocyanate, 5,5,7,9,9-pentanitro-7-aza-tridecane-1,13-diisocyanate, 3,3,5,5,7,9,9,11,11-nonanitro-7-aza-tridecane-1,13-diisocyanate and 3,3,5,5,7,7,9,11,11,13,13,15,15-tridecanitro-9-aza-heptadecane-1,17-diisocyanate respectively.

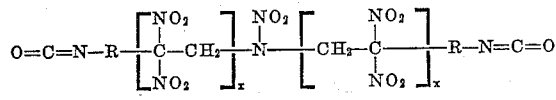

Thus it may be seen, from the foregoing examples that a wide variety of diisocyanates can be prepared by means of the procedure recited above by simply selecting appropriate starting materials.

It should be understood that the examples set forth above are provided in only an illustrative sense and are not intended to impose any limitations upon the scope of the invention.

The diisocyanates of this invention readily condense with nitroalkanols such as 2,2,2-trinitroethanol in the presence of a condensation catalyst such as boron trifluoride to form highly nitrated polyurethanes which are useful as high explosives. These compounds can be used in any conventional explosive missile, projectile, rocket, or the like, as the main explosive charge. An example of such a missile is disclosed in United States Patent No. 2,470,162, issued May 17, 1949. One way of using the high explosives in a device such as that disclosed in United States Patent No. 2,470,162, is to pack the crystalline explosive in powder form into the warhead of the missile. Alternatively, the crystals can be first pelletized and then packed. A charge thus prepared is sufficiently insensitive to withstand the shock entailed in the ejection of a shell from a gun barrel or from a rocket launching tube under the pressure developed from ignition of a propellant charge, and can be caused to explode on operation of an impact- or time fuse-mechanism firing a detonating explosive such as lead azide or mercury fulminate.

This application is a continuation-in-part of our co-pending application No. 377,686, filed August 31, 1953, now abandoned.

We claim:

1. As compositions of matter the nitro-amino diisocyanates having the general formula:

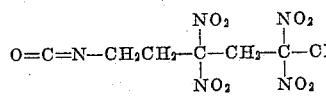

wherein R is a lower alkylene radical and $x$ is a small whole number from 1 to 3 inclusive.

2. As a composition of matter, 3,3,5,7,7-pentanitro-5-aza-nonane-1,9-diisocyanate having the formula:

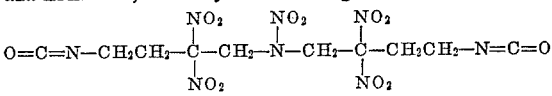

3. As a composition of matter, 3,3,5,5,7,9,9,11,11-nonanitro-7-aza-tridecane - 1,13 - diisocyanate having the formula:

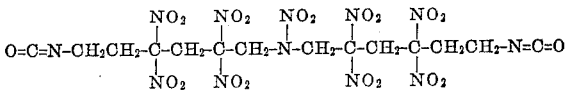

4. As a composition of matter, 4,4,6,8,8-pentanitro-6-aza-undecane-1,11-diisocyanate, having the formula:

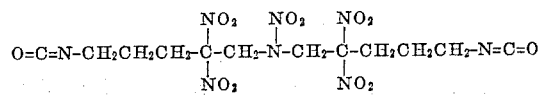

5. As a composition of matter, 3,3,5,5,7,7,9,11,11,13,13,15,15 - tridecanitro - 9 - aza-heptadecane-1,17-diisocyanate having the formula:

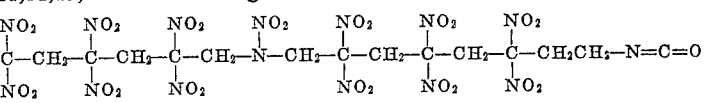

6. As a composition of matter, 5,5,7,9,9-pentanitro-7-aza-tridecane-1,13-diisocyanate having the formula:

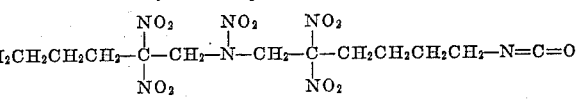

7. The process for preparing nitroamino diisocyanates having the general formula:

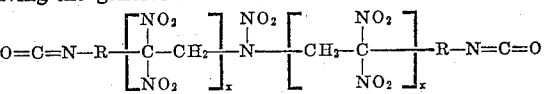

which comprises reacting a dibasic acid halide having the general formula:

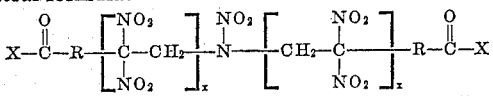

wherein R is a lower alkylene radical, $x$ is a small whole number from 1 to 3 inclusive, and X is halogen, with sodium azide and heating to effect rearrangement to the desired diisocyanate.

8. A method of preparing 3,3,5,7,7-pentanitro-5-aza-nonane diisocyanate which comprises reacting 4,4,6,8,8-pentanitro-6-aza-undecane-1,11-dioic acid halide with sodium azide and heating to effect rearrangement to the diisocyanate.

9. A method of preparing 3,3,5,5,7,9,9,11,11-nonanitro-7-aza-tridecane diisocyanate which comprises reacting 4,4,6,6,8,10,10,12,12-nonanitro - 8 - aza-pentadecane-1,15-dioic acid halide with sodium azide and heating to effect rearrangement to the diisocyanate.

10. A method of preparing 4,4,6,8,8-pentanitro-6-aza-undecane diisocyanate which comprises reacting 5,5,7,9,9-pentanitro-7-aza-tridecane-1,13-dioic acid halide with sodium azide and heating to effect rearrangement to the diisocyanate.

11. The method of preparing 5,5,7,9,9-pentanitro-7-aza-tridecane diisocyanate which comprises reacting 6,6,8,10,10 - pentanitro - 8 - aza-pentadecane-1,15-dioic acid halide with sodium azide and heating to effect rearrangement to the diisocyanate.

12. A method of preparing 3,3,5,5,7,7,9,11,11,13,13,15,15-tridecanitro-9-aza-heptadecane diisocyanate which comprises reacting 4,4,6,6,8,8,10,12,12,14,14,16,16-tridecanitro-10-aza-nonadecane-1,19-dioic acid halide with sodium azide and heating to effect rearrangement to the diisocyanate.

No references cited.